Figure 1:
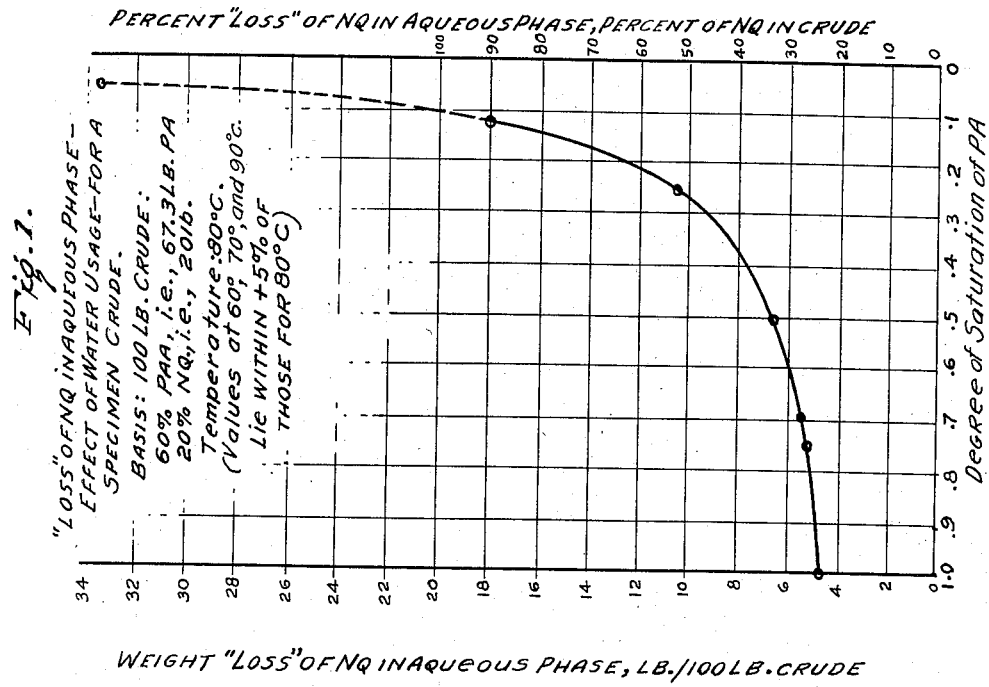

INVENTOR
JOHN MAYHEW SAYWARD,
BY
Alexander T. Kardos
ATTORNEY

United States Patent Office 2,783,251
Patented Feb. 26, 1957

2,783,251

RECOVERY OF NAPHTHOQUINONE FROM CRUDE PRODUCT CONTAINING PHTHALIC ANHYDRIDE AND NAPHTHALENE

John Mayhew Sayward, Springdale, Conn., assignor to American Cyanamid Company, New York, N. Y., a corporation of Maine Application November 3, 1953, Serial No. 390,063

1 Claim. (Cl. 260—396)

This invention relates to the treatment of mixtures containing naphthoquinone and, more particularly, refers to a novel and improved method for recovering naphthoquinone from crude mixtures comprising phthalic anhydride and/or phthalic acid and naphthoquinone.

In the preparation of naphthoquinone by the controlled catalytic oxidation of naphthalene vapors with air, naphthoquinone is formed as one of the products of the reaction, along with other compounds, such as, for example, phthalic anhydride. Additionally, some unreacted naphthalene is present in varying quantities in the crude reaction mixture. For example, using a suitable catalyst and operating conditions such as would be employed in industry, a yield of approximately 20 to 35 lbs. of naphthoquinone per 100 lbs. of naphthalene has been obtained, as well as from about 1 to 3 times that amount of phthalic anhydride, and from 0.2 to about 1.5 times that amount of unchanged naphthalene. Such values are merely typical and illustrative and are not to be considered as limitative of the possible yields; in fact, yields of up to 45-50 lbs. of naphthoquinone per 100 lbs. of naphthalene have been obtained.

Several method for recovering the naphthoquinone from crude mixtures containing phthalic anhydride and/or acid and naphthoquinone have been hitherto proposed in the industry. According to one method, the mixture is extracted with a solvent, such as benzene, in which the naphthoquinone is soluble but in which the phthalic acid is insoluble. This method is inefficient and dangerous due to the use of the expensive and flammable solvent and is cumbersome and only moderately effective. Additionally, shortages in the supply of the solvent benzene have detracted from the dependability of the process.

Another method involves the extraction of the mixture of naphthoquinone and phthalic acid or anhydride with an aqueous solution of an alkali, such as sodium carbonate, from which the insoluble naphthoquinone is separated by filtration in an impure form, which may be purified by recrystallization from an organic solvent as a yellow-green product having a melting point of 122° to 123° C.

While extraction with aqueous alkalies, or equivalent materials, is potentially the cheapest and most convenient method for recovering naphthoquinone from mixtures also containing phthalic acid and/or anhydride, this method, when applied, may cause deterioration of the naphthoquinone and does not produce a naphthoquinone in sufficiently pure form to be acceptable for some commercial purposes.

One object, therefore, of the present invention is to provide an efficient and inexpensive method for the recovery of naphthoquinone from mixtures containing phthalic anhydride and/or acid and naphthoquinone, which process does not involve expensive solvents or require the separation and recovery thereof.

Another object of the present invention is to provide a simple and economical process for recovering naphthoquinone in good yield and quality from the crude converter product resulting from the catalytic oxidation of naphthalene, which process employs materials in plentiful supply and which is readily adaptable to continuous or semi-continuous batch operation.

Still another object of the present invention is to provide a process of recovering naphthoquinone without deteriorating the same and in a sufficiently pure form to permit its use in commercial processes.

Figure 2:
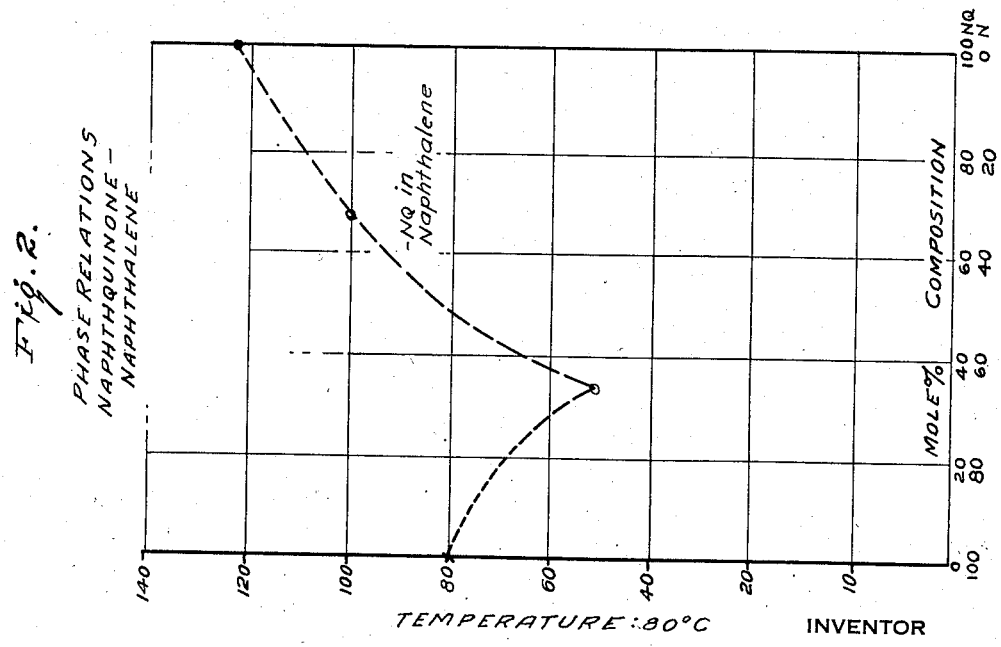

Other objects, as well as benefits and advantages of the invention will be apparent from the following description and accompanying drawings, wherein:

Fig. 1 shows the loss of naphthoquinone to the aqueous phthalic acid phase due to varying water usage; and Fig. 2 shows the phase relationship in the naphthoquinone-naphthalene phase for varying temperatures.

I have discovered a simple means of recovering high-grade, substantially pure naphthoquinone from a crude solid mixture of naphthoquinone, naphthalene and phthalic anhydride, such as may be obtained as a converter product in the controlled catalytic oxidation of naphthalene vapors with air. The principle involved in the separation of the naphthoquinone is that of liquid-liquid extraction. If a crude converter product of appropriate naphthalene content and suitable ratio of naphthoquinone to phthalic anhydride is dissolved in hot water, the product liquefies and the phthalic anhydride is hydrated to phthalic acid. As a consequence, a four-component system, namely; water:phthalic acid:naphthoquinone:naphthalene results and two phases are formed; namely, an aqueous layer containing the bulk of the phthalic acid and a naphthoquinone-naphthalene layer containing the bulk of the naphthoquinone.

To determine the complete quaternary phase diagram for the complex four-component system would be a major task and far beyond the requirements and needs of a description of the present invention. Sufficient testing and analyzing, however, has established that naphthoquinone is highly soluble in the liquid naphthalene layer, whereas phthalic acid is negligibly soluble therein. Furthermore, the naphthoquinone is much less soluble in the hot water layer than is the phthalic acid. To state this in terms of ratios, the results have indicated that the distribution ratio of naphthoquinone between naphthalene and aqueous phthalic acid solution is high, whereas, conversely, the distribution ratio of phthalic acid between naphthalene and aqueous phthalic acid solution is low.

The physical separation of these layers is relatively a simple and inexpensive matter and, consequently, two separate solutions may be obtained, one containing the bulk of the naphthoquinone and the other containing the phthalic acid. In the case of the layer containing the naphthoquinone and the naphthalene, the separation of the solvent naphthalene from the naphthoquinone, for example, by distillation or extraction processes, is relatively a simple matter, but may be omitted in the event that the naphthoquinone is intended to be used in a process in which the presence of naphthalene would not be objectionable, such as when naphthoquinone is reacted with butadiene in the preparation of anthraquinone.

In the case of the aqueous layer containing the phthalic acid, the phthalic acid may be recovered therefrom by crystallization upon cooling. If desired, the crystals may be leached, for example with chloroform, to recover additional small amounts of naphthoquinone. The phthalic acid crystals may then be further processed as desired or required, such as, for example, by being dehydrated to recover phthalic anhydride. The mother liquor from which the phthalic acid crystals have been obtained may be returned to the extraction process, or disposed of otherwise, as desired.

Generally, in the extraction of naphthoquinone from the crude converter product, according to the principles of the present inventive concept, sufficient water should be used to give a saturated or nearly saturated solution of aqueous phthalic acid at a temperature of from about 60° up to about 100° C. In the event that other amounts of water and other temperatures are used, the process becomes unsatisfactory for reasons to be described hereinafter.

When the crude converter product is added to the hot water, it melts and becomes thoroughly dispersed by sufficient agitation or stirring. The naphthalene-naphthoquinone layer readily separates from the aqueous phthalic acid solution in a short time, and a physical division of the two layers may then be effected. The naphthalene-naphthoquinone layer is essentially free of water and analysis shows it to contain more than about 40% to 60% naphthoquinone and less than 3% of phthalic acid.

The extraction results of several experimental runs are tabulated in Table I.

sary if the naphthoquinone:naphthalene mol ratio in the oil layer is to be greater than 1:1, that is, 50 mol percent naphthoquinone. Temperatures much above 90° C., however, may not be desirable or practicable due to the increasing losses of naphthoquinone to the water layer as the temperature approaches 100° C., as well as to the greater possibility of decomposition of the naphthoquinone and the boiling of the water. Consequently, the preferred temperature of the present invention falls within the range of from about 75° C. to about 90° C.

With regard to the amount of water to be used in the dissolving of the crude converter mixture, it has been established that the loss of naphthoquinone to the water layer increases rapidly as the degree of saturation of the aqueous phthalic acid layer falls below 75%, at which point the percent loss is approximately 25%. Beyond that point and down to a saturation of 50%, whereat the loss is approximately 33%, the process might be marginally commercially practicable. Below a saturation of 50%,

TABLE I

| Temp., °C. | g. Crude | g. Water | PA 100 g. (H₂O+PA) | PA 100 g. (H₂O+crude) | Initial Wt. Ratios PAA/NQ | NQ/Nap. | NQ/(H₂O+crude) | Phase | NQ Percent Conc. | NQ Percent Recov. | PA Percent Conc. | PA Percent Recov. | Final Wt. Ratios NQ/Naph. | NQ/Aq. layer | PA/NQ | Apparent Distrib. Coeff.: NQ (naph.)/NQ (aq.) |
|---|---|---|---|---|---|---|---|---|---|---|---|---|---|---|---|---|
| 90 | 160.0 | 872 | 8.8 | 8.2 | 2.02 | 0.77 | 0.037 | oil | 44.0 | 87 | 2.5 | 2.1 | 0.805 | | | 95 |
|    |       |     |     |     |      |      |       | aq. | 0.8  | 20 | 7.4 | 77.5 |       | 0.0085 | 8.8 |    |
| 90 | 160.0 | 872 | 8.8 | 8.2 | 2.02 | 0.77 | 0.037 | oil | 38.0 | 76 | 2.6 | 2.2 | 0.63 | | | 72 |
|    |       |     |     |     |      |      |       | aq. | 0.8  | 21 | 9.7 | 102.0 |      | 0.0087 | 11.3 |   |
| 95 | 70.0  | 292 | 11.4 | 10.4 | 2.02 | 0.77 | 0.047 | oil | 39.0 | 70 | 3.8 | 3.0 | 0.69 | | | 46 |
|    |       |     |     |     |      |      |       | aq. | 1.4  | 29 | 10.7 | 88.0 |     | 0.015 | 7.2 |     |
| 85 | 70.0  | 292 | 11.4 | 10.4 | 2.02 | 0.77 | 0.047 | oil | 43.0 | 80 | 3.3 | 2.7 | 0.815 | | | 65 |
|    |       |     |     |     |      |      |       | aq. | 1.2  | 26 | 10.5 | 94.5 |     | 0.0125 | 10.0 |   |
| 90 | 82.5  | 817 | 6.3 | 6.0 | 2.97 | 1.28 | 0.021 | oil | 57.0 | 74 | 3.4 | 1.5 | 1.44 | | | 155 |
|    |       |     |     |     |      |      |       | aq. | 0.9  | 44 | 6.2 | 97.0 |     | 0.0093 | 6.7 |    |
| 90 | 82.5  | 817 | 6.3 | 6.0 | 2.97 | 1.28 | 0.021 | oil | 53.0 | 70 | 2.0 | 0.8 | 1.17 | | | 140 |
|    |       |     |     |     |      |      |       | aq. | 0.8  | 39 | 6.4 | 104.0 |    | 0.0084 | 7.7 |    |
| 90 | 63.8  | 632 | 6.2 | 6.0 | 2.97 | 1.28 | 0.021 | oil | 55.0 | 68 | 3.9 | 1.7 | 1.32 | | | 121 |
|    |       |     |     |     |      |      |       | aq. | 1.1  | 48 | 6.5 | 101.0 |    | 0.0109 | 6.0 |    |

Basis: Crude for first four runs: 23.0% NQ; 29.0% naphthalene (by difference); 48.0% PAA (53.8% equivalent PA). Crude for last three runs 23.1% NQ; 18.2% naphthalene (by difference); 58.7% PAA (65.8% equivalent PA).

With regard to the affect of temperature on the loss of naphthoquinone to the water layer, it has been established that the loss is only slight or negligible within the temperature range of from about 60° C. up to close to 100° C. On this basis, therefore, any working temperature in that range that is convenient operationally for the extraction process may be selected, depending upon the particular circumstances of the specific situation involved. However, within the principles of the present invention, a temperature above 75° C. is necessary the naphthoquinone loss increases sharply at a rate so great probably as to render the process economically impracticable. Consequently, within the principles of the present invention, any water usage within the range from 50% saturation and saturation is acceptable, although the preferred range extends from about 75% to 100% saturation.

The conclusions set forth in the preceding two paragraphs have been derived from the data tabulated in Table II and Table III and illustrated in Figures 1 and 2.

TABLE II

*Water usage and NQ "loss" at various temperatures for a specimen crude*

[Basis: 100 lb. crude 60% PAA, i. e., 67.3 lb. PA; 20% NQ; 20% naphthalene (by difference).]

| Temp., °C. | Degree of PA Saturation | $W_{H_2O}$, lb. | $W_{soln.} = W_{H_2O} + W_{PA}$, lb. | $C_{PA}$, percent | $S°_{NQ}$, percent | $S_{NQ}$, percent | $L_{NQ}$, lb. | Percent $L_{NQ} = \frac{L_{NQ}}{20} \times 100$, percent |
|---|---|---|---|---|---|---|---|---|
| 90 | 1.0 | 596 | 663 | 10.15 | 0.76 | 1.17 | 4.75 | 24 |
|    | 0.5 | 1,259 | 1,326 | 5.08 | 0.51 | 0.72 | 6.80 | 34 |
|    | 0.125 | 5,237 | 5,304 | 1.27 | 0.36 | 0.41 | 18.11 | 90 |
| 80 | 1.0 | 775 | 842 | 8.0 | 0.55 | 0.87 | 4.63 | 23 |
|    | 0.5 | 1,617 | 1,684 | 4.0 | 0.39 | 0.55 | 6.56 | 33 |
|    | 0.125 | 6,669 | 6,736 | 1.0 | 0.27 | 0.31 | 18.16 | 91 |
| 70 | 1.0 | 1,203 | 1,270 | 5.3 | 0.39 | 0.59 | 4.68 | 23 |
|    | 0.5 | 2,473 | 2,540 | 2.65 | 0.30 | 0.40 | 6.67 | 33 |
|    | 0.125 | 10,093 | 10,160 | 0.67 | 0.18 | 0.26 | 18.59 | 93 |
| 60 | 1.0 | 1,858 | 1,925 | 3.5 | 0.27 | 0.41 | 4.77 | 24 |
|    | 0.5 | 3,773 | 3,850 | 1.75 | 0.19 | 0.26 | 6.84 | 34 |
|    | 0.125 | 15,333 | 15,400 | 0.44 | 0.13 | 0.15 | 18.29 | 92 |

$S°_{NQ}$ = percent solubility of naphthoquinone in water alone
$C_{PA}$ = percent concentration of phthalic acid present
$L_{NQ}$ = loss of naphthoquinone into the aqueous phase
$W_{soln.}$ = weight of the solution
$S_{NQ}$ = naphthalene solubility of naphthoquinone

TABLE III

Solubility of NQ and PA g./100 g. Solution ($H_2O$)

| Temp., °C. | Alone | | | Together | | | Ratio: Together/Alone | | Ratio: $S°_{NQ}/S°°_{PA}$ |
| --- | --- | --- | --- | --- | --- | --- | --- | --- | --- |
| | Percent solubility | | PA/NQ | Percent solubility | | PA/NQ | NQ | PA | |
| | NQ | PA | | NQ | PA | | | | |
| 30 | 0.028 | 0.8 | 29 | 0.027 | 0.8 | 30 | 1.0 | 1.0 | 0.0350 |
| 40 | 0.047 | 1.21 | 26 | 0.086 | 1.40 | 16 | 1.8 | 1.2 | 0.0336 |
| 50 | 0.072 | 1.80 | 25 | 0.160 | 2.30 | 14 | 2.2 | 1.3 | 0.0313 |
| 60 | 0.108 | 2.70 | 25 | 0.263 | 3.50 | 13 | 2.4 | 1.3 | 0.0309 |
| 70 | 0.157 | 4.10 | 26 | 0.385 | 5.30 | 14 | 2.45 | 1.3 | 0.0296 |
| 80 | 0.23 | 6.40 | 28 | 0.55 | 8.0 | 14.5 | 2.4 | 1.25 | 0.0290 |
| 90 | 0.31 | 9.2 | 30 | 0.76 | 10.15 | 13.4 | 2.45 | 1.1 | 0.0305 |

Table II, taken in conjunction with Figure 1, shows the weight and percentage loss of naphthoquinone to the aqueous phthalic acid phase, as affected by the increasing amount of the water used and the consequent decreasing degree of saturation of the aqueous phthalic acid phase. The desirability of using operating conditions in which the degree of saturation of the aqueous phthalic acid is at least 50%, and preferably at least 75% up to saturated conditions, is clear.

Table III shows the effect of varying temperatures on the solubility in water of naphthaquinone and phthalic acid, taken alone or together. The desirability of temperatures over 60° C. and up to 100° C., and preferably within the range 75° C. to 90° C., in view of the pertinent discussion and particularly Figure 2, is also clear.

Figure 2 sets forth the phase relations of naphthoquinone and naphthalene at varying temperatures and it is, of course, apparent in view of the preceding description that sufficient naphthalene must be present in order to provide the necessary solvating action on the napthoquinone. When naphthoquinone is made by the catalytic oxidation of napthalene and the crude converter product is recovered as a solid containing essentially all of the products of the reaction, no difficulties are normally encountered and the above-described processes proceed satisfactorily.

However, in some cases, the naphthalene concentration may not be sufficiently high to dissolve all of the naphthoquinone. For example, in the event that the hot converter gases coming from the reactor are passed through recovery apparatus such as a warm, wet absorber, the conditions therein may be sufficient to carry off large quantities of naphthalene. Consequently, in such a case the expelled naphthalene may be recovered and returned to the extraction process to provide the desired concentration of naphthalene. If desired, fresh naphthalene may be added, if such is found more convenient.

Although I have described but a few specific examples of my invention, I consider the case not to be limited thereby nor to the specific substances and operating conditions mentioned therein, but to include various other equivalent compounds of similar constitution and other equivalent operating conditions as set forth in the claim appended hereto. It is understood that any suitable changes, modifications or variations may be made without departing from the spirit or scope of the inventive concept.

I claim:

A process for the recovery of naphthoquinone from a mixture of phthalic anhydride, naphthoquinone and naphthalene obtained by the controlled catalytic oxidation of napthalene vapors with air and containing about 48–60% by weight of phthalic anhydride and about 20–29% of unchanged naphthalene, the balance being substantially all naphthoquinone, which comprises admixing sufficient water with said mixture at a temperature between about 80° C. and 90° C. to convert the phthalic anhydride to phthalic acid and to form an aqueous phthalic acid solution having a degree of saturation between about 75% and 100% and thereby forming a two-layer system consisting of an aqueous layer containing most of the phthalic acid and a non-aqueous naphthoquinone-naphthalene layer containing most of the naphthoquinone, and separating said layers and recovering the naphthoquinone from the non-aqueous layer.

References Cited in the file of this patent

UNITED STATES PATENTS

| | | |
| --- | --- | --- |
| 1,284,888 | Gibbs | Nov. 12, 1918 |
| 1,285,117 | Gibbs | Nov. 19, 1918 |
| 2,190,001 | Talbert | Feb. 13, 1940 |
| 2,536,833 | Bailey | Jan. 2, 1951 |

OTHER REFERENCES

Marek & Hahn, "Catalytic Oxidation of Organic Compounds in the Vapor Phase," 1932, p. 408.